United States Patent
Kofford

[15] 3,648,663
[45] Mar. 14, 1972

[54] POULTRY WATERING CUP

[72] Inventor: Reed S. Kofford, P.O. Box 453, Van Nuys, Calif. 91408

[22] Filed: Oct. 5, 1970

[21] Appl. No.: 77,854

Related U.S. Application Data

[62] Division of Ser. No. 790,016, Jan. 9, 1969, Pat. No. 3,563,207.

[52] U.S. Cl. .................................................. 119/75, 119/72.5
[51] Int. Cl. ................................................................ A01k 7/00
[58] Field of Search .................... 119/72, 72.5, 75, 74, 79, 80

[56] References Cited

UNITED STATES PATENTS

| | | | |
|---|---|---|---|
| 1,632,842 | 6/1927 | Liening | 239/28 |
| 3,563,207 | 2/1971 | Kofford | 119/75 |
| 326,829 | 9/1885 | Balch | 119/75 |
| 1,646,246 | 10/1927 | Hazard | 119/75 |
| 2,486,729 | 11/1949 | Beckley | 119/72.5 |
| 2,690,160 | 9/1954 | Kagan | 119/72.5 |
| 2,749,882 | 6/1956 | Butker | 119/74 |
| 3,086,500 | 4/1963 | Spire | 119/74 |

FOREIGN PATENTS OR APPLICATIONS 141,330   4/1935   Austria ............................... 119/72.5

*Primary Examiner*—Aldrich F. Medbery
*Attorney*—Robert C. Comstock

[57] ABSTRACT

A poultry watering cup having a vertically movable valve stem normally held in an upward position by the water supply force. A cup is removably mounted on the valve assembly by frustoconical friction fit. The cup has a small well which surrounds the upper end of the valve stem. As poultry drink from the well, their beaks engage the upper end of the valve stem and depress it, causing the valve to open and refill the well.

2 Claims, 5 Drawing Figures

Patented March 14, 1972
3,648,663
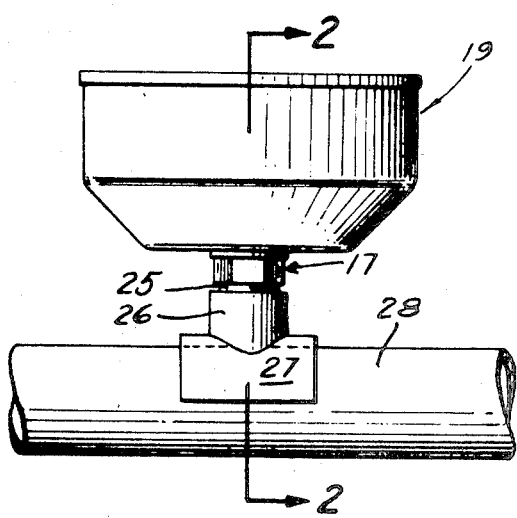
Fig. 1.
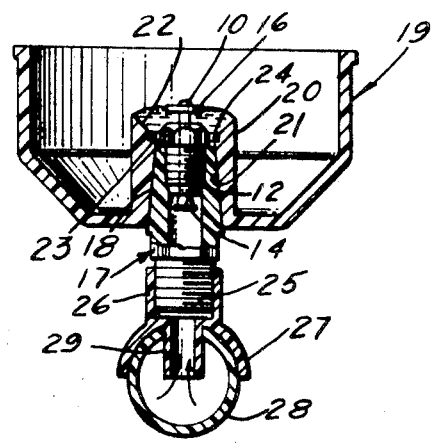
Fig. 2.
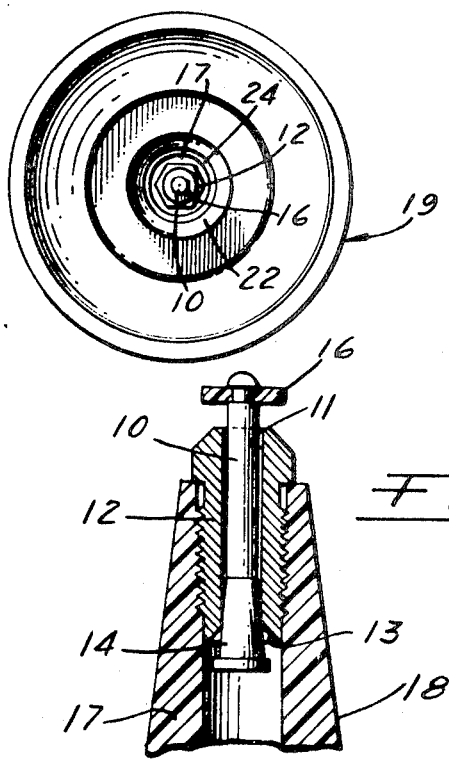
Fig. 3.
Fig. 5.
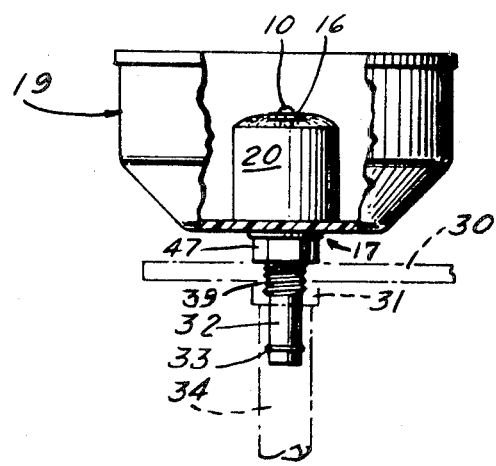
Fig. 4.
INVENTOR.
Reed S. Kofford
BY Robert C. Comstock
Attorney

POULTRY WATERING CUP

REFERENCE TO RELATED APPLICATION

This application is a divisional application of Ser. No. 790,016, filed Jan. 9, 1969 and now U.S. Pat. No. 3,563,207.

BACKGROUND OF THE INVENTION

1. Field of the Invention

The invention relates to an automatically self-filling watering cup which is particularly adapted for use by poultry.

2. Description of the Prior Art

Various types of self-filling poultry watering cups have existed in the past, most of them depending upon a counterweight and leverage to maintain a given level of water in a cup. All of the prior art devices known to the applicant are relatively expensive to manufacture, are complicated in their structure and operation, and are difficult to maintain and/or replace. They are also limited as to the ways and places in which they can be mounted.

SUMMARY OF THE INVENTION

The invention comprises a poultry watering cup assembly in which the cup itself is simpler to install and to change or replace because it is held by nothing more than simple friction grip.

The cup of the present invention is further novel in that it utilizes a peck-type valve in which a shallow well of water which is customarily and preferably topped by a convex meniscus bead surrounds the operating stem of the valve. Poultry are attacted to the well and/or bead of water and in drinking from it necessarily engage and operate the valve stem, causing additional water to flow into the well.

There is no fixed water level in the cup, and there is no counterweight of any kind. The cup assembly is far simpler than anything which has been used before, both in its original manufacture and assembly and in its operation and maintenance. It is capable of a substantially unlimited variety of installation types and locations. Only a small amount of water is customarily present in the cup and it is substantially free from algae and from contamination.

It is accordingly among the objects of the invention to provide a poultry watering cup having all of the advantages and benefits of the structure set forth. The invention also comprises such other objects, advantages and capabilities as will later more fully appear and which are inherently possessed by the invention.

While there are shown in the accompanying drawings preferred embodiments of the invention, it should be understood that the same are susceptible of modification and change without departing from the spirit of the invention.

DESCRIPTION OF THE DRAWINGS

FIG. 1 is a side elevational view of a poultry watering cup constructed in accordance with my invention, showing the cup mounted on a plastic water supply pipe;

FIG. 2 is a sectional view of the same taken on line 2—2 of FIG. 1, with the valve assembly shown in elevation;

FIG. 3 is a top plan view of the same;

FIG. 4 is a side elevational view, partly broken away, of a poultry watering cup mounted remotely from the water supply pipe;

FIG. 5 is an enlarged sectional view of the valve assembly.

DESCRIPTION OF THE PREFERRED EMBODIMENT

A preferred embodiment which has been selected to illustrate the invention comprises a peck-type valve in which a valve stem 10 is mounted for vertical reciprocal movement within a passage 11 of substantially larger diameter which extends axially through a valve body 12. The lower end of the valve body 12 is provided with a frustoconical opening 13, through which water is adapted to enter the passage 11. The lower end of the valve stem 10 is provided with a frustoconical portion 14, which is normally urged by water pressure upwardly into a position closing the opening 13.

The upper end of the valve stem 10 is provided with an annular groove, in which an annular washer 16 is mounted. Downward pressure exerted upon the washer 16 by the beak or other head portion of poultry or other animals will cause the valve stem 10 to move downwardly within the valve body 12. This moves the frustoconical portion 14 downwardly, permitting water to flow through the opening 13 into the lower end of the passage 11. Water pressure urges the water upwardly and out through the upper end of the passage 11.

The valve body 12 is screw threadedly mounted in the upper end of an elongated fitting 17. The fitting 17 has a frustoconical outer periphery 18.

A watering cup 19 is provided with a central upwardly directed annular portion 20 having a frustoconical inner wall 21, which is formed complementarily to the outer periphery 18 of the fitting 17.

The upper end of the fitting 17 is provided with a short upper wall 22, which extends upwardly and outwardly at an angle, to form a right-angular triangle in cross section. A shorter wall 23 extends vertically downwardly from the inner end of the wall 22 to a ledge 24, the inner edge of which connects with the inner walls 21.

The lower portion of the fitting 17 may be formed in two different configurations. In the embodiment shown in FIGS. 1 and 2 of the drawings, the lower part of the fitting 17 is provided with an externally screw threaded lower end 25, which is adapted to be screw threadedly mounted in the upper end of an adapter 26. The adapter 26 is provided with an arcuate saddle 27 which fits around the outer periphery of a circular water supply pipe 28. The adapter 26 has a stem 29, which extends downwardly into the pipe 28 through an opening in the top of the pipe. The lower end of the stem 29 is disposed adjacent to the center of the pipe 28, so that it draws clean water, free from both floating scum and sedimentary deposits.

This embodiment is shown in FIGS. 1 and 2 of the drawings, in which it will be seem that the pipe 28 directly supports the adapter 26, which in turn supports the fitting 17. The fitting 17 in turn supports the cup 19, so that the entire watering cup assembly is directly mounted upon and supported by the water supply pipe 28.

In the other embodiment of the fitting 17, which is shown in FIG. 4 of the drawings, the lower part of the fitting 17 is provided with external screw threading 39, which is adapted to extend through a mounting plate 30. A nut 31 is mounted on the threading 39 so that the mounting plate 30 is held between the nut 31 and a hexagonal enlargement 47 on the fitting 17 directly above the threading 39.

Extending downwardly from the threading 39 is an integral stem 32 having a ring 33 adjacent the lower end thereof. A water supply hose 34 is mounted around the lower end of the stem 32. The hose is connected to a suitable source of water supply. In this embodiment, the fitting 17 and the cup 19 are supported by the mounting plate 30.

In use, the cup 19 is supplied with water from a suitable source of gravity flow water supply. Water can be caused to flow into the cup by depressing the upper end of the valve stem 11 through contact with the washer 16. Water will enter the cup through the upper end of the passage 11 and flow into a small well which surrounds the upper end of the valve assembly. This well is defined by the ledge 24 and the walls 23 and 22.

The water is held within this well and, due to surface tension and capillary attaction, forms an arcuate convex meniscus bead which arches upwardly between the upper end of the wall 22 and the outer edge of the washer 16, as shown in FIGS. 2 and 4 of the drawings.

Poultry are attracted to this small well and bead of water and drink from it. In doing so, they necessarily contact the washer 16 with some portion of their beaks or heads and cause it to be depressed, so that additional water flows into the well. Any surplus water will overflow from the well and will be caught within the cup itself.

It will be noted that the cup 19 is held on the fitting 17 by friction fit engagement between the complementary frustoconical wall 21 of the cup and the frustoconical outer periphery of the fitting. The cup 19 can easily be removed from the fitting 17 by merely lifting it upwardly and it can be replaced by merely moving it downwardly into position. No tools or equipment of any kind are required and it is not necessary to disconnect the water when cleaning or replacing the cup.

I claim:

1. A poultry watering cup assembly comprising vertically directed water supply means having an outer wall, a watering cup having an inner vertically directed wall formed complementarily to said outer wall, said inner wall extending vertically upwardly from adjacent the center and bottom of said watering cup, said outer wall being of upwardly narrowed frustoconical shape, and said inner wall being of complementarily formed frustoconical shape, said watering cup being manually removably mounted on said water supply means, with said walls being in slidably engageable and removable frictional relationship with each other.

2. The structure described in claim 1, said water supply means comprising a valve body having a vertically directed water flow passage extending therethrough and a valve stem mounted for reciprocal movement within said passage to control the flow of water through said passage into said cup, said outer wall surrounding said valve body.

* * * * *